(12) United States Patent
Stone

(10) Patent No.: US 6,600,553 B1
(45) Date of Patent: Jul. 29, 2003

(54) THREE DEGREE-OF-FREEDOM TELESCOPING GEOMETRY SCANNER

(75) Inventor: William C Stone, Gaithersburg, MD (US)

(73) Assignee: National Institute of Science and Technology U.S. Dept of Commerce

(*) Notice: Subject to any disclaimer, the term of this patent is extended or adjusted under 35 U.S.C. 154(b) by 0 days.

(21) Appl. No.: 09/422,300

(22) Filed: Oct. 21, 1999

Related U.S. Application Data
(60) Provisional application No. 60/106,828, filed on Nov. 3, 1998.

(51) Int. Cl.[7] .......................... G01C 3/08; G01B 11/26; E02F 3/76; B25J 19/00
(52) U.S. Cl. .................... 356/4.01; 356/141.1; 172/4.5; 901/47
(58) Field of Search .......................... 901/47; 172/4.5; 180/167, 169; 356/141.1, 5.01–5.15, 4.01

(56) References Cited

U.S. PATENT DOCUMENTS

| | | | |
|---|---|---|---|
| 3,715,953 A | * | 2/1973 | Allan |
| 3,781,111 A | * | 12/1973 | Fletcher et al. |
| 3,897,151 A | * | 7/1975 | Lecroy |
| 4,386,848 A | * | 6/1983 | Clendenin et al. |
| 4,477,184 A | * | 10/1984 | Endo |
| 4,636,846 A | | 1/1987 | Villarreal |
| 4,703,820 A | | 11/1987 | Reinaud |
| 4,764,982 A | * | 8/1988 | Pfund |
| 4,790,402 A | | 12/1988 | Field |
| 4,846,297 A | | 7/1989 | Field |
| 4,996,468 A | | 2/1991 | Field |
| 5,114,226 A | | 5/1992 | Goodwin et al. |
| 5,235,398 A | * | 8/1993 | Miller et al. |
| 5,548,397 A | * | 8/1996 | Kool et al. .............. 356/141.1 |
| 6,108,076 A | * | 8/2000 | Hanseder ................. 356/141.1 |

* cited by examiner

Primary Examiner—Stephen C. Buczinski
(74) Attorney, Agent, or Firm—Davis & Kendall, PC; Tyrone Davis; John S. Kendall

(57) ABSTRACT

The invention relates to a three-dimensional measuring device, comprising a rotating 360 degree sensor head, a laser scanner and an extendable mast system. The sensor head contains a 360 degree rotating multi-faceted mirror, which determines total path distance from the laser scanner to a particular target. Angular orientations on both the scanner and the faceted mirrors are calculated by a precision encoding system. The measured total path distance, mast system extension, scanner head rotation, mirror rotation angles, and mast deflection are all used to calculate the location of a target point in 3-D space relative to the scanner. The sensing device can be utilized in the construction and nuclear power areas. In the nuclear power area, the mast system can be extended into a contaminated area which the sensor remains outside the contaminated area, thereby avoiding contamination problems.

16 Claims, 5 Drawing Sheets

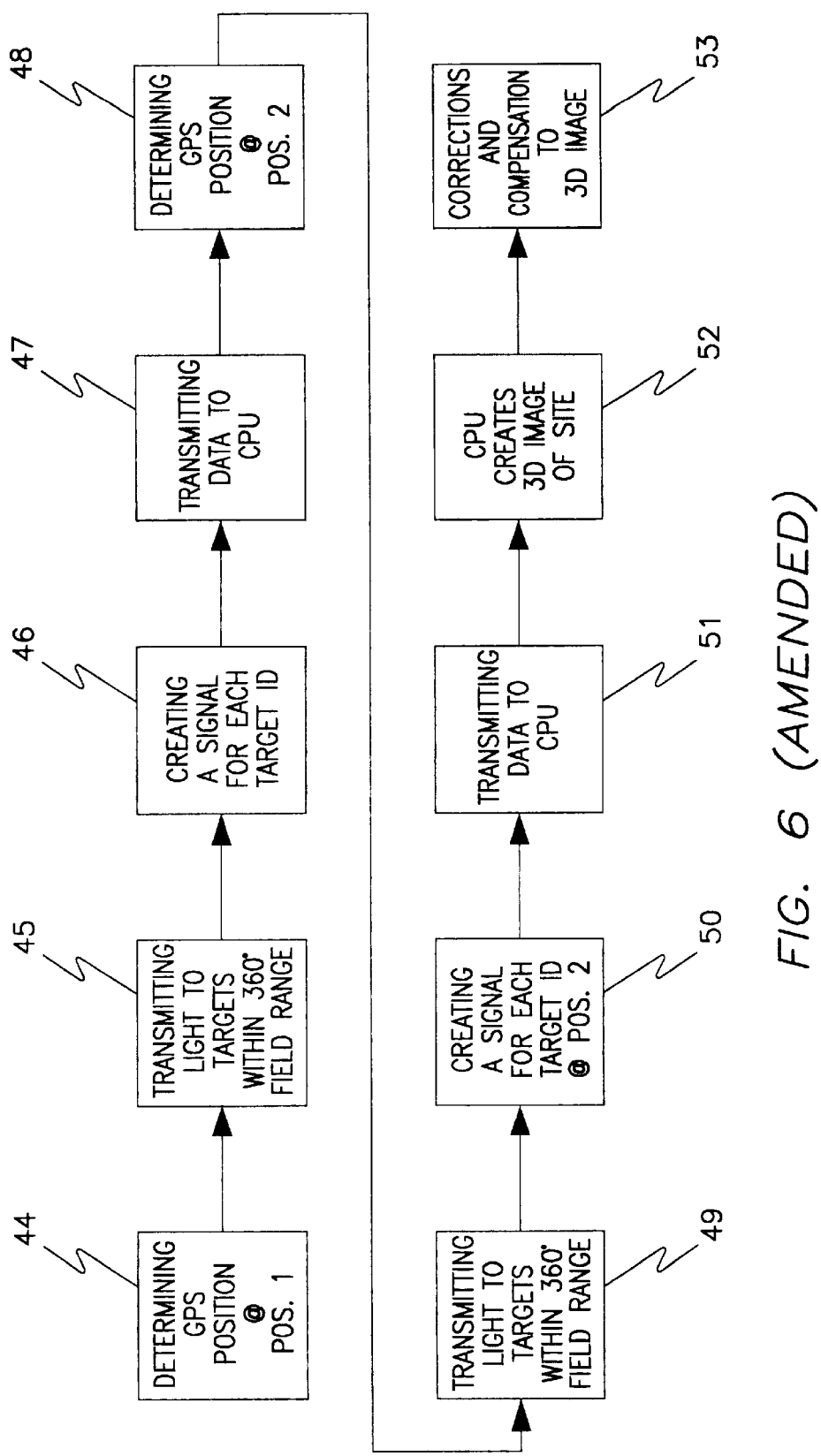
FIG. 6 (AMENDED)

THREE DEGREE-OF-FREEDOM TELESCOPING GEOMETRY SCANNER

FIELD OF INVENTION

The invention relates to the scanning device for the creation of a precise 3-dimensional (3D) stereo range image. More specifically, to an improved method and apparatus for the laser scanning and development of a real-time 3D image. This invention is the subject of a provisional application that was filed on Nov. 3, 1998 and assigned document No. 60/106,828.

BACKGROUND OF INVENTION

The uses for three-dimensional metrology are expanding rapidly. In the construction industry, there are increased demands for prompt information concerning the status of a job site. The immediate impediment to the effective use of scanning technology is the "Line of Sight limitations". If a pile of dirt is in front of an existing stationary scanner anything behind the pile invisible. There is no present ability to look over or around the obstacle. This problem also extends to the interior of buildings thereby preventing the development of as-built scans. Therefore, all such interior scans presently are 2½D images and not true 3D.

In the nuclear industry the current approach to developing interior geometry of hot cells generally involves the use of time-consuming techniques. For example, in a hot cell environment the accurate location of nozzle positions is critical for the fabrication of remotely handled piping jumpers. Because of the critical nature of the work workers cannot depend upon the accuracy of shop drawings. In addition, these areas have high levels of radioactivity thus preventing long-term exposure by workers. Surveying is impossible because of the limited space available for equipment and instruments. Photogrammetry is sometime used to develop a 3D image of hot cell areas. 3D coordinate measurements can be made from stereo pair photographs. It is a system adapted from aerial photography mapping.

In this method, a scanner reads the photographs and a computer calculates the coordinates. The use of Photogrammetry is limited in that when used in a hot cell environment the camera lenses will fog and target grids must be developed for each item needing to be surveyed. The use of target grids is untenable because the items are constantly moved by remote manipulators. The use of laser scanning devices could also be used to image the inside of the hot cell, but these suffer from the problems previously pointed out. Such as, line of sight limitations, limited field of view of a stationary laser, and the fact that lasers are not radiation hard, that is radiation causes the equipment to malfunction.

Another reference which provides laser scanning techniques but do not overcome line of sight limitations, nor hot cell contamination problems is U.S. Pat. No. 5,114,226 to Goodwin et al. which discloses a 3-dimensional vision system, comprising scanner optics, a laser head, receiver circuitry, and a control system microprocessor. The scanning optics may include a facet wheel with a galvanometer scanner.

Field discloses in U.S. Pat. Nos. 4,790,402, 4,846,297, and 4,996,468 an automated guided vehicle, comprising a laser scanner mounted on a platform. The angle of elevation of the light beam emitted by the laser scanner is controlled by a linear actuator.

U.S. Pat. No. 4,703,820 to Reinaud discloses a vehicle guidance system involving a laser beam, horizontal and vertical scanning motors, and targets. Through control of the scanning motors, the laser beam can be moved through a desired scanning pattern.

U.S. Pat. No. 4,636,846 issued to Villarreal discloses an optical scanning apparatus comprising a light source, a camera, and a conical mirror. The scanner apparatus is employable in radioactive environments.

What is needed but not provided in the prior art is an apparatus for laser scanning that has a telescoping mast and the ability to take scans at multiple positions and a method for developing a real-time 3D image and overcoming line of sight problems associated with hot cells and construction sites. Additionally, it would also be helpful to provide such features in a compact, inexpensive, and simple design. Finally, it would be helpful to have a system which works in conjunction with the global positioning system.

SUMMARY OF THE INVENTION

The inventor has overcome the problems remaining from the prior art by devising a 3-degree-of-freedom scanning device for the creation of a precise 3-dimensional stereo range image. The device employs a standard single point diode pulsed or continuous wave laser ranging system being operated in a non-cooperative target mode. The laser source and range determination electronics are located in an environmentally secure chamber at one end of a hollow telescoping nested mast and are oriented such that the outgoing laser pulse/beam is directed down the center of the hollow mast system. The mast is deployed (extended) by a precision extension mechanism to accurately determine the instant extension length of the telescoping mast. There may be two or more elements to the telescoping mast assembly. The mast system includes a displacement feedback means, which precisely determines the instant deflections and slopes of the sensor head, which is attached to the end of the furthest extended telescope tube. The sensing head is modular and is capable of being detached from the mast. In addition, the sensing head is capable of being rotated a full 360° degrees about a longitudinal centerline of the extension mast tube by a precision encoding system which provides a real time feedback on the angular orientation of the sensing head relative to a reference position on the telescoping mast system.

The advantages of the present invention are achieved with a multi-faceted precision rotating mirror which serves to deflect the ranging laser pulse/beam towards a presumed non-cooperative target scene point. The light reflected from the target point is picked up by the rotating mirror and returned down the hollow core of the telescoping mast where it is sensed by the ranging element receiver and used to determine a total path distance from the laser source to the target. The rotating mirror may have one or more reflecting surfaces and also contains a precision encoding system means, which provides real-time feedback on the angular orientation of the mirror.

It is an object of the invention to provide a 3 degree of freedom laser scanner system.

It is another object of the invention to provide a mast mounted 3D laser scanner.

Another object of the invention is to provide a 3D laser scanner for use in radiation contaminated areas.

It is another object to provide a 3D laser scanner where the scanning head can be remotely placed in a high radiation area with the electronics located outside the contamination area.

It is yet another object to provide a 3D scanner in conjunction with a global coordinate system.

Other features and advantages of the present invention will be apparent that the following description in which the preferred embodiments have been set forth in conjunction with the accompanying drawings

BRIEF DESCRIPTION OF THE DRAWINGS

In describing the preferred embodiments of the invention reference will be made to the series of figures and drawings briefly described below.

FIG. 6 is a flow chart detailing the method of scanning.

There may be additional structures described in the foregoing application which are not depicted on one of the described drawings. In the event such a structure is described but not depicted in a drawing, the absence of such a drawing should not be considered as an omission of such design from the specification.

DETAILED DESCRIPTION OF THE PREFERRED EMBODIMENT

Reference will now be made in detail to the present preferred embodiment of the invention, an example of which is illustrated in the accompanying drawings. While the invention will be described in connection with a preferred embodiment, it will be understood that it is not intended to limit the invention to that embodiment. On the contrary, it is intended to cover all alternatives, modifications, and equivalents as may be included within the spirit and scope of the invention defined in the appended claims.

Figure 1:
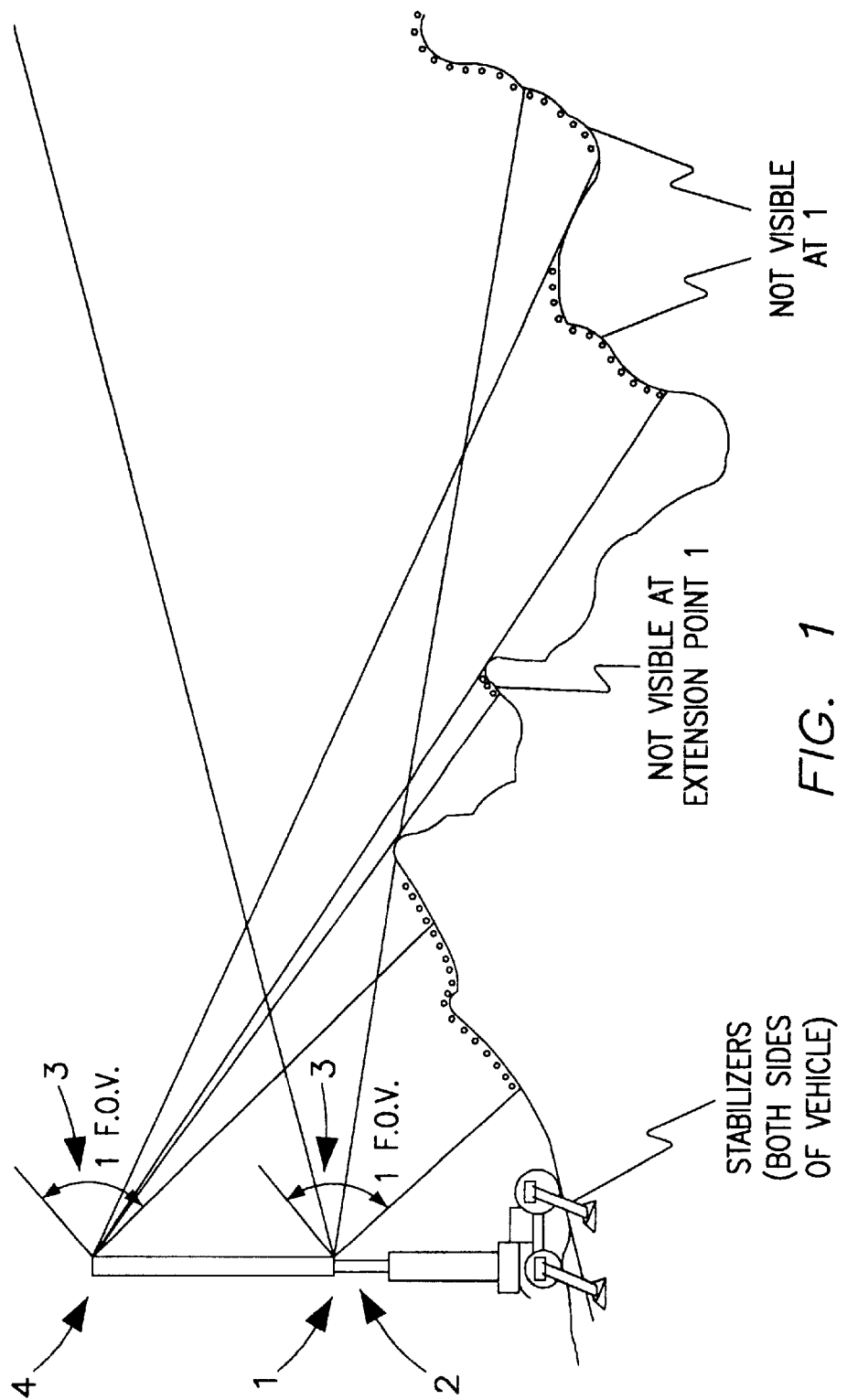
FIG. 1 depicts the invention in a remote area performing a two position scanning process in an uneven terrain.

FIG. 1 shows an embodiment of the invention. The mast scanner (1) has an infinite number of vertical locations it can attain. In position 1 (2) the scanners' field of view (F.O.V) is indicated by the vertical angle (3) at which scanning data can be acquired. This angle is typically 60 to 120 degrees. Although an accurate scan can occur the varying terrain elevations causes obvious line of sight problems. The invention (1) overcomes this problem by allowing the scanning head to be positioned at position 2 (4) and take a second scan. The invention then can be moved in conjunction with a global positioning system (not shown) to interpret the data and develop an accurate 3D image of the terrain.

The invention has the ability communicate with a global positioning system and mark the exact location of the scan and site. Then it takes a scan at position 1 (2) and transfers the data to a storage medium. The invention then can be positioned either at position 2 (4) or can be move to an alternate location and a second global position determined. A second scan is conducted at position 2 (2) and all the data received by the computer which correlates the data to generate an accurate 3D image of the site without the line of site limitations of the other scaning methods.

Figure 2:
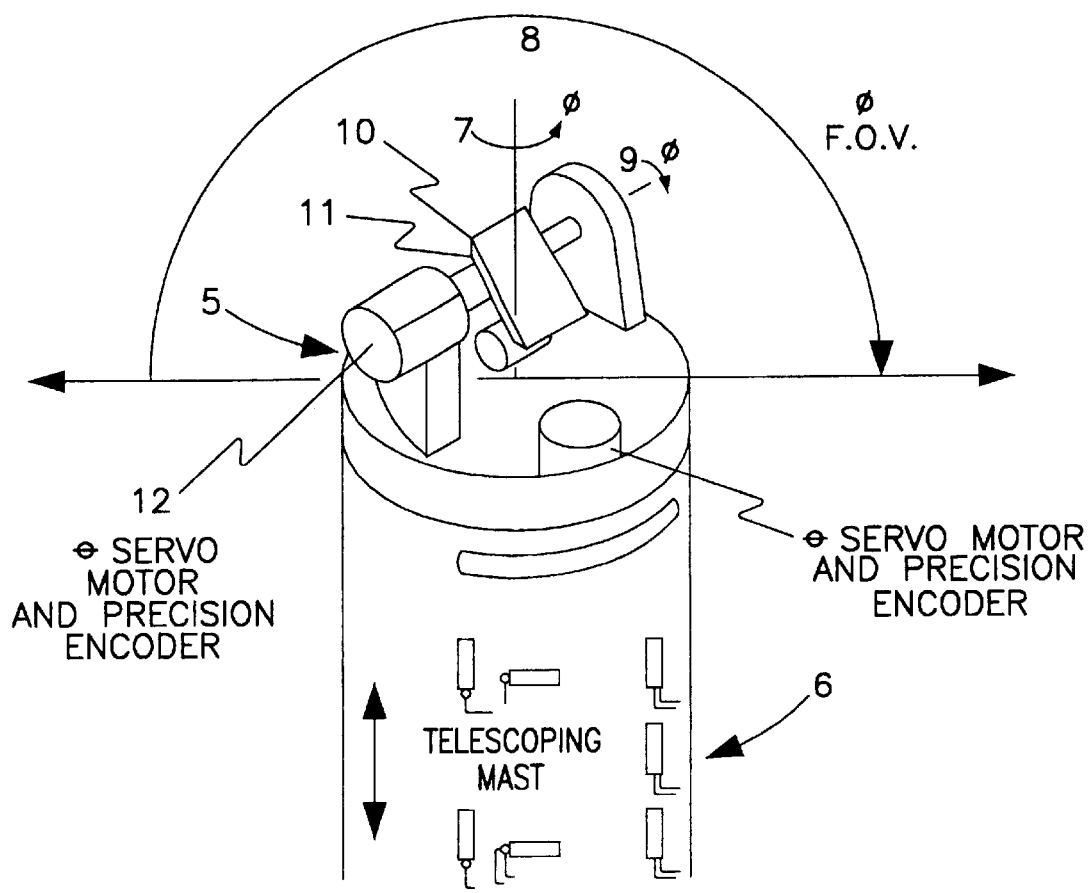
FIG. 2 shows the invention's scanning head.

Referring to FIG. 2, the scanning head (5) is attached to a telescopic mast (6). The scanning head (5) rotates about an axis (7) which is concentric with the centerline (8) of the telescoping mast (6) components of a mechanical drive shaft system (12) which causes the rotation (9) of the scanning head (5). In this embodiment, the scanning head mirror (10) is caused to rotate about the axis (7) by rotary transmission. Mirror (10) is supported by a mirror frame (11). The mirror frame (11) can be either a plate or a multi-sided polygonal extruded shape. The mirror frame (11) can be hollow or solid, which serves as a mounting fixture for one or more mirrors. The use of a multi-faceted frame and multiple mirrors provides a faster scanning rate for a given angular rotation rate of the mirror frame (11).

Figure 3:
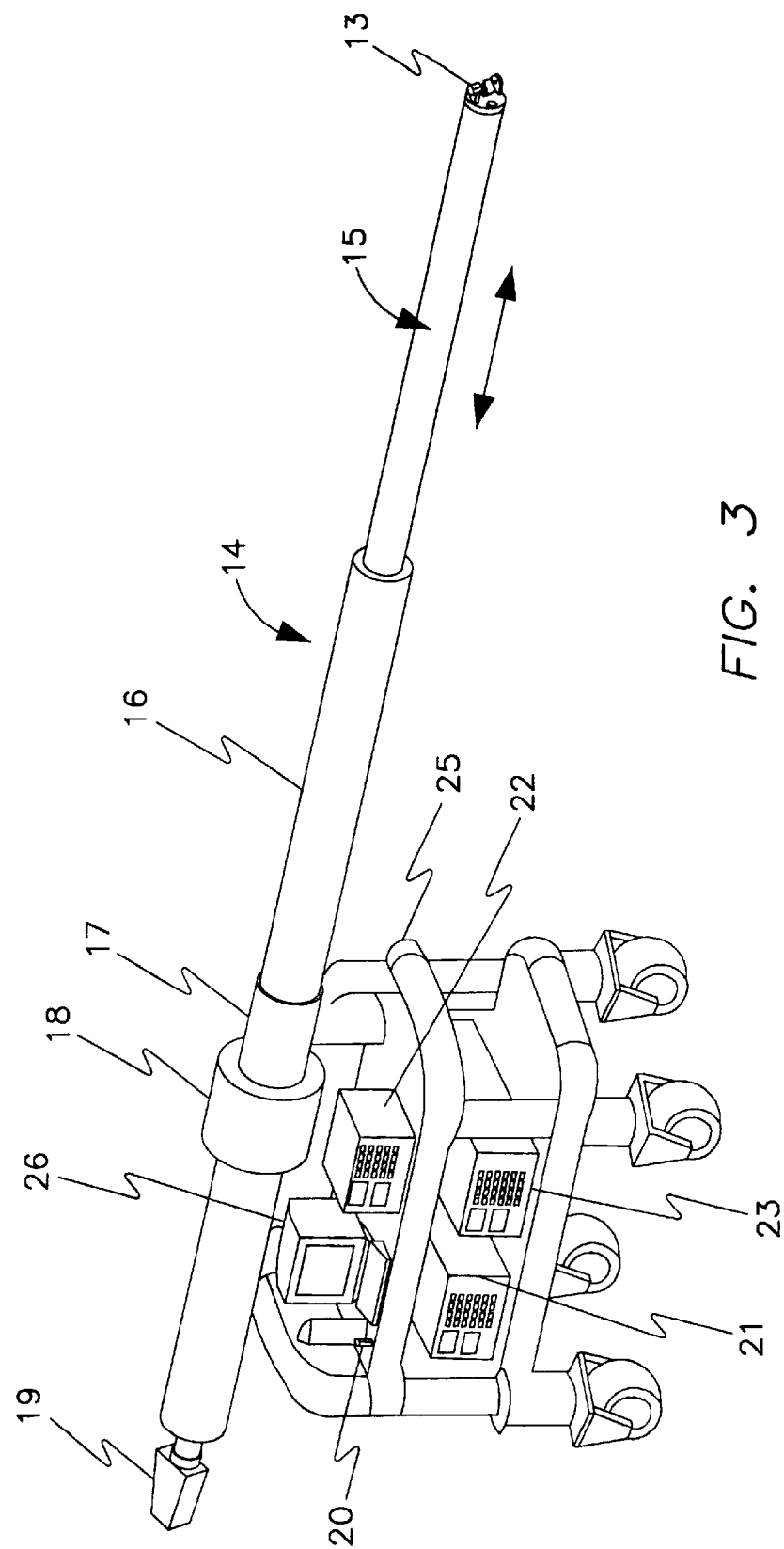
FIG. 3 depicts the invention in a mobile form for a hot cell application.

In FIG. 3, an embodiment of the invention configured for a hot cell application is shown. It includes a scanning head (13) attached to a telescoping mast system (14) consisting of elements (15), (16), and (17). The associated electronics and power supplies (20) are located at the end of the mast (14) and away from the extended mast (15) by the extention/retraction actuator (18). It includes a laser ranging system (19), power (21), and data storage systems (22), alignment monitoring sensors (23) and rotary encoders (not shown), mobile carrier frame (25), and a wireless data communications computer system (26).

In a hot cell operation, the device is maneuvered to a service sleeve. The primary mast base (17) is brought up flush with the wall in such a fashion as to engage a positive pressure seal on the service sleeve. The mast (14) is extended by the actuator (18) into the hot cell and the extension process is done in increments. Direct imaging can be made of the area immediately behind and adjacent the scanning head (13). By precoding the software the entire rear wall can be imaged in addition to the remaining walls, ceiling and floor. With each further extension into the cell more data not previously visible due to line of sight limitations can be taken.

Figure 4:
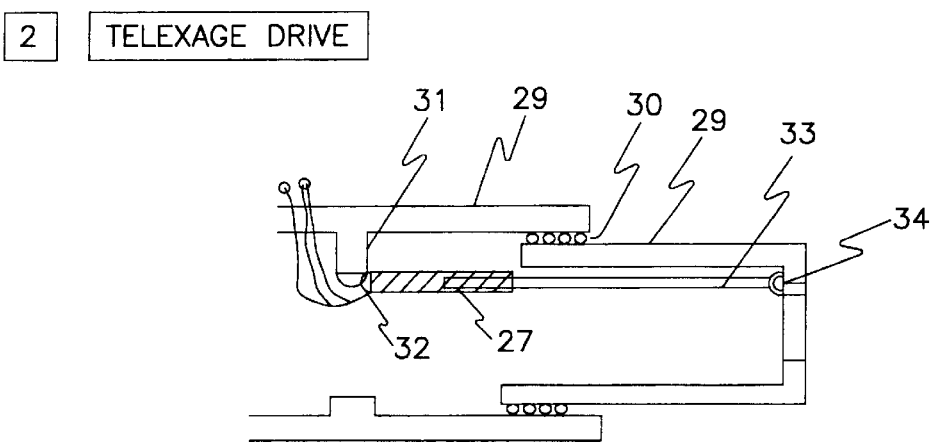
FIG. 4 shows a cutaway of the mast segments and its linear movement system.

Referring to FIG. 4 the mast extension/actuation systems can be accomplished using a linear actuator (27). A precision linear potentiometer or differential measurement device (28) can be used to determine the exact extension of the mast segment (29). A continuous bearing sleeve (30) allows the smooth extension of the mast segments (29) by the linear potentiometer (28). The linear actuator (27) is attached to the main mast carrier segment (31) by a bracket (32) so that it does not move. The core (33) is attached to the base of the sensor head (34) which allows it to move when the mast segments (29) are extended or retracted.

Figure 5:
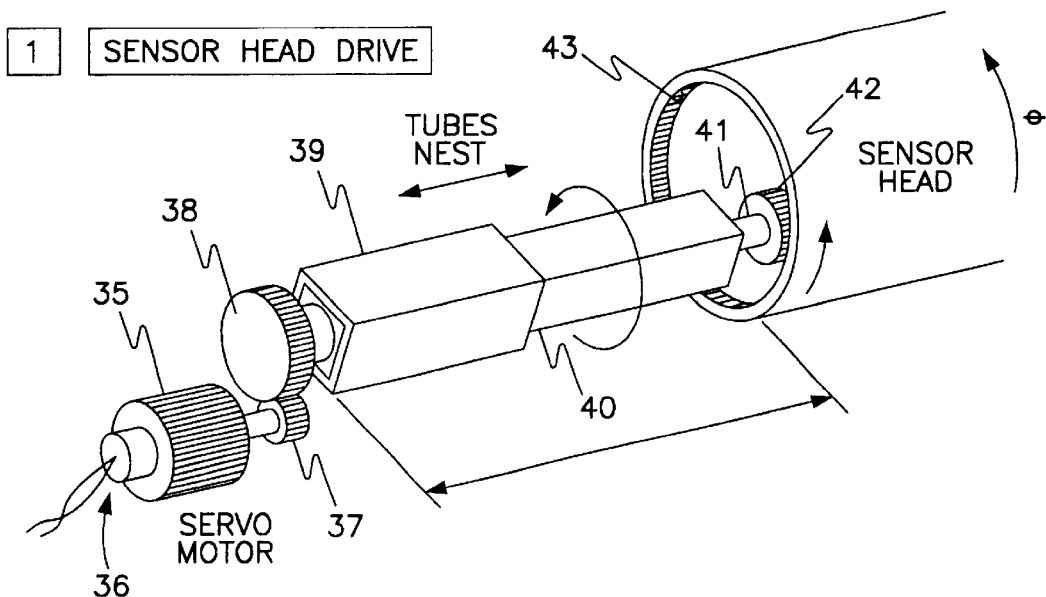
FIG. 5 shows a the scanning head rotation system.

FIG. 5 shows one embodiment for rotating the scanning head. A rotary drive (35) equipped with a precision angular encoder (36) is used to engage rotary transmission gear (37). Rotary transmission gear (37) engages rotary transmission gear (38) which in turn engages a hollow faceted torque shaft (39). Shaft (40) nests inside hollow toque shaft (39). Torque shaft (40) drives interface (41) which in turn drives rotary transmission gear (42) and rotating rotary gear (43).

FIG. 6 shows a flow chart of how the invention creates the 3D image. The wireless data communications computer establishes a position of the invention with a global positioning satellite (44). After determining the position of the invention at position 1, the laser ranging system emits a laser light (45). The laser light reflects off of the mirrors of the mirror frame and the laser light hits the objects on site. Simultaneously, a transport mechanism connected to the scanner head allows the laser light to rotate about the centerline of the mast 360° and the mirror frame is connected to a transport mechanism which moves the mirror frame 60° to 120° for a field of view shot of the site (46). Any line of sight problems are noted, and the laser ranging system determines the range of the objects creating a data signal for each and sending them to the wireless data communications computer.(47) The invention is moved to another location on site and the initial steps are repeated for determining the global position of the invention and a second scan is conducted at position 2 (48–51) and the data signals are sent to the wireless data communications computer (52) where it coordinates the data to create a 3D image of the site (53) and overcoming any line of site or terrain problems which would have prevented a real time image.

Further modification and variation can be made to the disclosed embodiments without departing from the subject and spirit of the invention as defined in the following claims. Such modifications and variations, as included within the scope of these claims, are meant to be considered part of the invention as described.

What is claimed:

1. An apparatus for creating a 3d image of a site comprising:
   a modular scanning head;
   a telescoping mast attached at one end to the modular scanning head and said telescoping mast being hollow having a centerline x, and said modular scanning head having the ability to rotate 360 degrees about a centerline y;
   a laser ranging system attached to the other end of said telescoping mast and said laser ranging system being positioned so that the scanning head is in communication with said laser ranging system along the centerline x of the mast, and said laser ranging system creating a data coordinate from the rotational position of said modular scanning head and the distance to an object in said site; and
   a wireless data communications computer system receiving said data coordinates from said laser ranging system and having the ability to receive a position coordinate from a global positioning system, whereby said wireless data communications computer system creates a 3d image of said site.

2. The apparatus for creating a 3D image of a site as recited in claim 1 wherein said scanning head includes a mirror frame, a mirror attached to said mirror frame, and a scanning platform.

3. The apparatus for creating a 3D image of a site as recited in claim 2 wherein said scanning head further includes a first transport mechanism attached to said scanning platform and rotates said scanning platform around said centerline x.

4. The apparatus for creating a 3D image of a site as recited in claim 3 further comprising a second transport mechanism said second transport mechanism being connected to said mirror frame and having the ability to rotate said mirror frame 360° about a centerline y.

5. The apparatus for creating a 3D image of a site as recited in claim 4 wherein said laser ranging system includes a laser light source, said laser light source emitting a laser light which reflects off said mirror and hits an object and said laser ranging system determines the range of said object creating a data signal and sending said data signal to said wireless data communications computer.

6. The apparatus for creating a 3D image of a site as recited in claim 5 whereby said wireless data communications computer receives said data signal from said laser ranging system and communicates with a global positioning system and determines the location of the object.

7. The method of creating a multiple position 3D scan of a site using a laser scanning device comprising the steps of:
   providing a wireless communications device;
   communicating with a global positioning system;
   determining a first location of the laser scanning device;
   taking a scan of the site at a first position;
   referencing all obstructions and terrain;
   generating a first set of signals for the obstructions and terrain and sending them to the wireless communications device;
   storing said first set of signals;
   moving said laser scanning device to a second position;
   communicating with said global positioning system;
   determining a second location of the laser scanning device;
   taking a scan of the site at a second position;
   referencing all obstructions and terrain;
   generating a second set of signals for the obstructions and terrain and sending them to the wireless communications device;
   retrieving said first set of signals for the obstructions and terrain; and
   coordinating said first set of signal for obstructions and terrain with said second set of signals for the obstructions and terrain and create a real time 3D image of the site.

8. The method of creating a multiple position 3D scan of a site using a laser scanning device as recited in claim 7 wherein said laser scanning device comprises a scanning head; a mast attached at one end to the scanning head and said mast being hollow having a centerline x; a laser ranging system attached to the other end of said mast and said laser ranging system being positioned so that the scanning head is in communication with said laser ranging system along the centerline of the mast; and a wireless data communications computer system in communication with said laser ranging system and having the ability to communicate with a global positioning system.

9. The method of creating a multiple position 3D scan of a site using a laser scanning device as recited in claim 8 wherein said scanning head includes a mirror frame, a mirror attached to said mirror frame, and a scanning platform.

10. The method of creating a multiple position 3D scan of a site using a laser scanning device as recited in claim 9 wherein said scanning head further includes a first transport mechanism attached to said scanning platform and rotates said scanning platform around said centerline x.

11. The method of creating a multiple position 3D scan of a site using a laser scanning device as recited in claim 10 further comprising a second transport mechanism said second transport mechanism being connected to said mirror frame and having the ability to rotate said mirror frame 360° around a centerline y.

12. The method of creating a multiple position 3D scan of a site using a laser scanning device as recited in claim 11 wherein said step of taking a scan further includes a laser light source, said laser light source emitting a laser light which reflects off said mirror and hits an object, said laser ranging system determining the range of said object, creating a data signal and sending said data signal to said wireless data communications computer.

13. The method of creating a multiple position 3D scan of a site using a laser scanning device as recited in claim 12 whereby said step of generating a first set of data signals further comprises said wireless data communications computer receiving said data signal from said laser ranging system and determines the location of the obstructions and terrain.

14. The method of creating a multiple position 3D scan of a site using a laser scanning device as recited in claim 13 whereby said step of generating a second set of data signals further comprises said wireless data communications computer receiving said data signal from said laser ranging system and determining the location of the obstructions and terrain.

15. An apparatus for creating a 3D image of a hot cell comprising:
- a scanning head, said scanning head further including a scanning platform and a mirror frame being attached to a scanning platform, a first transport mechanism attached to said scanning platform and rotating said platform, and a second transport mechanism connected to said mirror frame having the ability to rotate said frame 360 degrees about a centerline y;
- a telescoping mast attached at one end to the scanning head and said mast being hollow having a centerline x;
- a laser ranging system attached to the other end of said mast and said laser ranging system so that the scanning head is in communication with said laser ranging system along the centerline x of said mast, and said laser ranging system creating a data coordinate from the rotational position of said scanning head and the distance to an object in said site; and
- a wireless data communications computer system receiving said data coordinates from said laser ranging system and having the ability to receive a position coordinate from a global positioning system, whereby said wireless data communications computer system creates a 3d image of said hot cell.

16. The apparatus for creating a 3D image of a hot cell as recited in claim 15 whereby said mirror frame includes multiple mirrors attached to said mirror frame.

* * * * *